(12) United States Patent
Pontius et al.

(10) Patent No.: US 8,099,614 B2
(45) Date of Patent: Jan. 17, 2012

(54) POWER MANAGEMENT FOR BUSES IN CMOS CIRCUITS

(75) Inventors: Tim Pontius, Crystal Lake, IL (US); Swati Saxena, Oak Park, IL (US); Neal Wingen, Inverness, IL (US); Niranjan A. Puttaswamy, San Jose, CA (US)

(73) Assignee: NXP B.V., Eindhoven (NL)

( * ) Notice: Subject to any disclaimer, the term of this patent is extended or adjusted under 35 U.S.C. 154(b) by 971 days.

(21) Appl. No.: 12/066,113

(22) PCT Filed: Sep. 11, 2006

(86) PCT No.: PCT/IB2006/053217
§ 371 (c)(1),
(2), (4) Date: Mar. 7, 2008

(87) PCT Pub. No.: WO2007/031937
PCT Pub. Date: Mar. 22, 2007

(65) Prior Publication Data
US 2008/0256377 A1    Oct. 16, 2008

Related U.S. Application Data

(60) Provisional application No. 60/716,730, filed on Sep. 12, 2005.

(51) Int. Cl.
*G06F 1/00*     (2006.01)
*G06F 1/26*     (2006.01)
*G06F 3/00*     (2006.01)
*G06F 13/14*    (2006.01)
*G11C 5/14*     (2006.01)
*H04M 1/00*     (2006.01)

(52) U.S. Cl. ........ 713/324; 713/320; 365/227; 455/574; 710/18; 710/305

(58) Field of Classification Search ............... 713/320, 713/324; 710/18, 305; 365/227; 455/574
See application file for complete search history.

(56) References Cited

U.S. PATENT DOCUMENTS

| 6,360,284 | B1 * | 3/2002 | Brown et al. | 710/15 |
| 6,448,812 | B1 * | 9/2002 | Bacigalupo | 326/83 |
| 6,657,534 | B1 * | 12/2003 | Beer et al. | 340/3.1 |
| 6,765,433 | B1 * | 7/2004 | Kao | 327/544 |
| 6,774,735 | B2 | 8/2004 | Senthilkumar et al. | |
| 2004/0151149 | A1 | 8/2004 | Song et al. | |
| 2004/0153678 | A1 | 8/2004 | Ahmad et al. | |

FOREIGN PATENT DOCUMENTS

| EP | 1383032 A2 | 1/2004 |
| EP | 1204017 A1 | 5/2005 |
| WO | 0065428 A1 | 11/2000 |

* cited by examiner

*Primary Examiner* — Stefan Stoynov

(57) ABSTRACT

The invention relates to a controlled shut-down of an electronic circuit or circuits such that the electrical power consumption of that circuit or circuits is minimized and that each said circuit is at a status which is a pre-determined state (42; 52) of that said circuit wherein all of its own control and messaging signals are taken to their zero level. The present invention claimed relates to the methodology of entering said circuit into this pre-determined state (42;52); where all said signal and messaging lines are taken to zero; thereby reducing power consumption within an electronic circuit when its status is defined as being shut-down or standby.

19 Claims, 4 Drawing Sheets

POWER MANAGEMENT FOR BUSES IN CMOS CIRCUITS

The invention relates generally to power management in integrated circuit design and more particularly to a method and apparatus for reducing power consumption by disabling power sources of functional blocks within an integrated circuit when other than in use.

It is generally a desirable feature of any electronic circuit that its power consumption is minimized during active operation and also when shutdown or placed into standby. This applies to circuits connected to the power grid and to circuits connected to portable power sources such as batteries, either primarily or intermittently such as during emergencies. A non-exhaustive list of examples of devices that receive their primary power from batteries include mobile telephones, personal data analyzers, portable music systems, and GPS receivers. The industry is increasingly looking for methods to reduce power consumption in integrated circuits or within so-called multichip modules (MCMs) or systems-on-a-chip (SOC), wherein increased functional integration and reduced interface port count already results in low power consumption.

Aside from increased integration, techniques have been studied where a clock signal is disabled or has its frequency reduced in order to either eliminate or reduce the dynamic power consumed by a circuit. This applies to both clock signals supplied to a circuit and those generated within the circuit. Another approach to reducing power consumption is to remove power applied to functional circuit blocks by reducing or removing power to the power source rails of the functional circuit blocks.

Integrated circuits including SOCs and MCMs are growing in complexity, functionality, capacity and speed with every generation. Today's cellular telephone can equally act as video recorder, digital camera, World Wide Web browser and music storage device. Thus circuits internal to the telephone contain anything from one or two functional blocks to several tens or hundreds of functional blocks. These blocks are often capable of communicating independently one of another. As a result, a typical communication network includes some elements—communication circuits—that are enabled and some elements that are disabled, simultaneously.

In a scheme disclosed by Francis et al in EP 1 204 017, clock control is handled by a control block, which determines when to shut down a specific feature and also acts to control shut down operations. Due to the increasing complexity of circuits and of communication networks, a circuit's ability to locally determine whether a block within said circuit is busy or idle is difficult, often beyond the limited control options of Francis et al.

Where a power-down is established simply by removal of the clock signal, it will be appreciated that this simply freezes a circuit into its last state and fixes the power at that level. The circuit is not necessarily at a state wherein its power consumption is mostly reduced, which is wherein most gates are in a configuration to consume minimal power. Therefore the power consumption of that approach is variable between each power-down activity. This requires designers to assume increased consumption and thereby minimize projected operating times from full battery charge. Power consumption of a circuit is further reduced by removing supply voltage to a section of a circuit.

There are two major issues with known power-down techniques. A first issue relates to functional operation of a circuit. A second, with power consumption of circuits when powered down. Functional operation of circuits is of significant concern when they operate with other circuits across a network, a bus, or when they are intended for generic interoperability in the case of a functional design block. In these cases, a protocol or specification exists for the operation of the functional block. As such, powering such a block down often involves powering down a portion of the circuit other than the actual output ports thereof. Alternatively, it involves waiting until the circuit is other than interacting with other circuits before removing power thereto. Unfortunately, both of these options are problematic. In the first case, power consumption of the output ports is often on the order of or higher than that of the remainder of the circuit. In the later case, many protocols do not support power down and, as such, circuits supporting these protocols simply cannot have portions thereof powered down.

Power consumption when a circuit is powered down is also of concern. Though a circuit is intended to be powered by a power source via the power rails, each input port thereto draws power as do some of the output ports therefrom. Thus, a signal applied to an input port of a powered down circuit often results in current draw into the input port of the non-functional circuit block. Power consumed in this fashion is wasted since it does not result in functional circuit activity. Also of concern is that power at an input port of a single functional block may result in power at an output port of said functional block which in turn results in power at an input port to a subsequent functional block, and so forth as the power propagates through the powered down functional blocks. Further exasperating this problem is the low voltage operation of current electronic circuits. With low voltage operation, circuits operate at low voltages and have small differences between the voltages defining a logical "0" or a logical "1."

When the supply voltage to a section of a circuit is removed to further reduce power consumption of the circuit, associated signals addressing the powered down circuit are still active, and it is known that such signals may indirectly power the circuitry that has been powered down. This phenomenon is known as passive forward biasing and its likelihood increases both with the number of control lines addressing a functional block, which are increasing as architectures have moved from 8 bit addresses to 16 bit addresses and now to 32 bit addresses, and the reduced differences in the voltages defining the states of a logic circuit, which have now become a small fraction of a volt.

Therefore the result of passive forward biasing is that the active input signals propagate within and result in a functional block entering a transient state between powered on and powered down. This results in circuitry drawing power, being quasi-powered, when the intent was for the functional block to consume little or no power. Additionally, the passive forward biasing often results in the output address lines of a powered down section of a circuit being at an indeterminate state. As these output lines are the functional input ports of a following circuit block in the distributed control system, it is possible for the powered down circuit to trigger false decisions or activities. Power on the address lines are not always determinable as they depend not only on the specific variables of the control system at the power down, for example active addresses, clock speed, and the line loading but also the manufacturing tolerances of the actual semiconductor circuit(s).

It would be advantageous to provide a method and circuit for reducing power consumption of functional circuit blocks within a circuit that overcomes some of the drawbacks of the prior art.

In accordance with the invention there is provided a method comprising: determining a first functional circuit block other than in use, the first functional circuit block including a first input port; providing an initiator circuit for providing a first signal to the first input port; and, powering down the first functional circuit block by: switching the initiator circuit to effect the first signal such that the first signal is in a low power state for a duration during which the first functional circuit block is powered down and powering down the first functional circuit block into a reduced power consumption state.

In accordance with another aspect of the invention there is provided a circuit comprising: a first functional circuit block including an input port; a initiator circuit for providing a first signal to the input port of the first functional circuit block; and, a power management block for switching the initiator circuit to effect the first signal such that the first signal is in a low power state for a duration during which the first functional circuit block is powered down and powering down the first functional circuit block into a reduced power consumption state.

In accordance with an embodiment of the invention there is provided a distributed control system comprising: a cluster of circuit blocks each having a clock signal input port, an output port, an addressable data input port, each of said blocks for performing part of a localized function of an overall system and wherein said clusters act in essence as single circuit blocks of a larger distributed control system; a master system clock distribution circuit coupled to the local clock input port of each of the plurality of circuit blocks; and, a master power management unit coupled to each of the plurality of circuit blocks, the master power management circuit controllably switching some of the plurality of circuit blocks independently to a reduced power consumption state wherein in the reduced power consumption state both the addressable data input port and the output port of the circuit block is in a low power state having lower power consumption than each other logic state, wherein the circuit may be powered down at different levels from individual clusters to clusters of clusters; and wherein localized circuits may define power down from the behavior of other adjacent clusters.

In accordance with the invention there is provided a method comprising: determining a first functional circuit block including a first input port; powering down the first functional circuit block by: controllably switching each circuit providing driven input data signals to the first functional circuit block until the driven input data signals are in a low power state, and, powering down the first functional circuit block into a reduced power consumption state.

In accordance with the invention there is further provided a method comprising: determining a first functional circuit block including a plurality of output ports; powering down the first functional circuit block by: controllably switching the first functional circuit block providing output data signals therefrom until the output data signals are in a low power state, and, then powering down the first functional circuit block into a reduced power consumption state.

Advantageously according to the invention one or more output signals from a functional circuit block are driven to their lowest power consumption state in accordance with the circuit operation. Thus protocols adhered to by the circuit are maintained, being followed until the output signals are in their lowest power consumption state. Preferably, all output signals of a functional circuit block are driven to their lowest power consumption state prior to a powering down of the functional circuit block.

Embodiments of the invention will now be described with reference to the drawings in which similar reference numerals designate similar features and in which.

Figure 3:
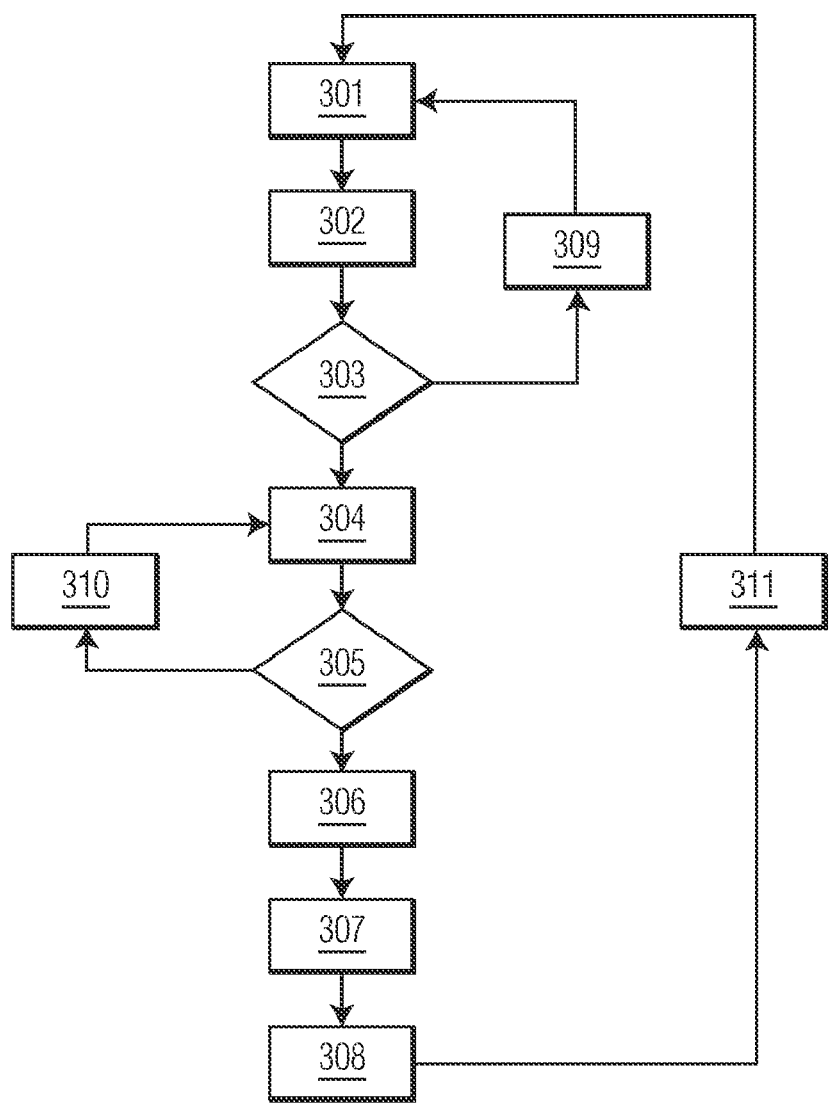
Figure 4:
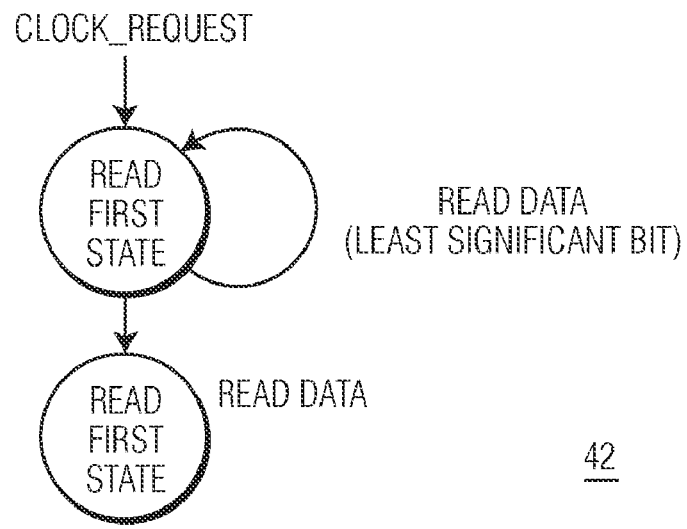
Figure 5:
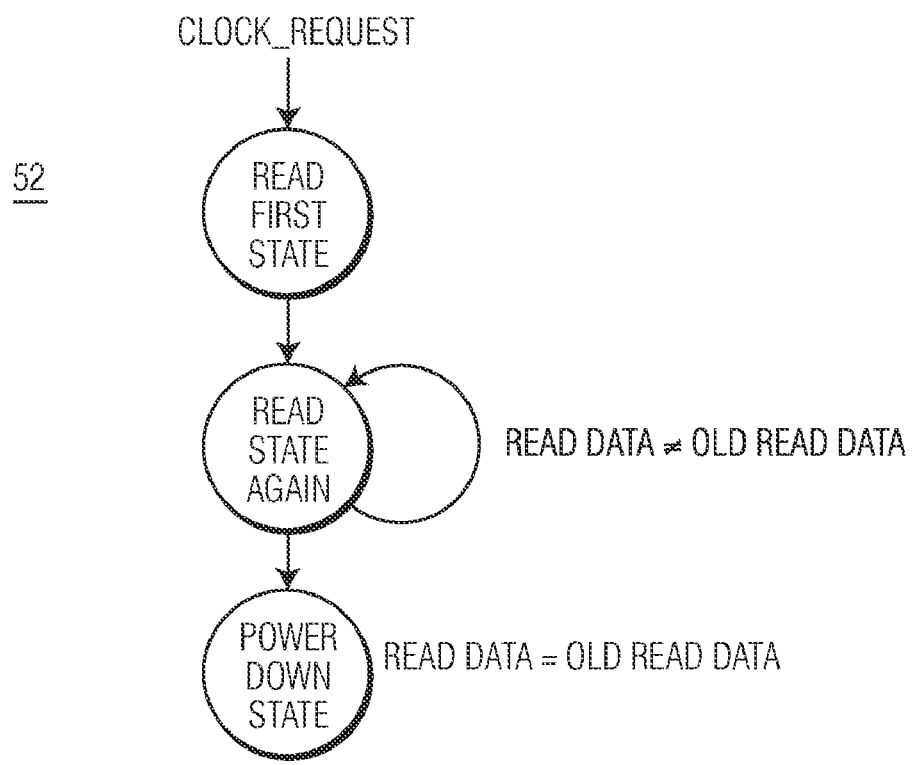

FIG. 3: A simplified flow-diagram for decision tree within distributed control system;

FIG. 4: A schematic of the state diagram for powering down an Initiator or Initiator Adaptor;

FIG. 5: A schematic representation of the state diagram for power down a Target or Target Adaptor; and, FIG. 6: Schematic representation of logical circuit to generate clock request.

In the following detailed description, the invention is described by reference to one specific embodiment, a controller in a distributed control system (DCS Controller). It will be appreciated by those skilled in the art that the underlying principles are also applicable to other control methodologies including non-distributed systems. Further embedded levels of functionality from hard wiring through to application driven code are supported.

Figure 1:
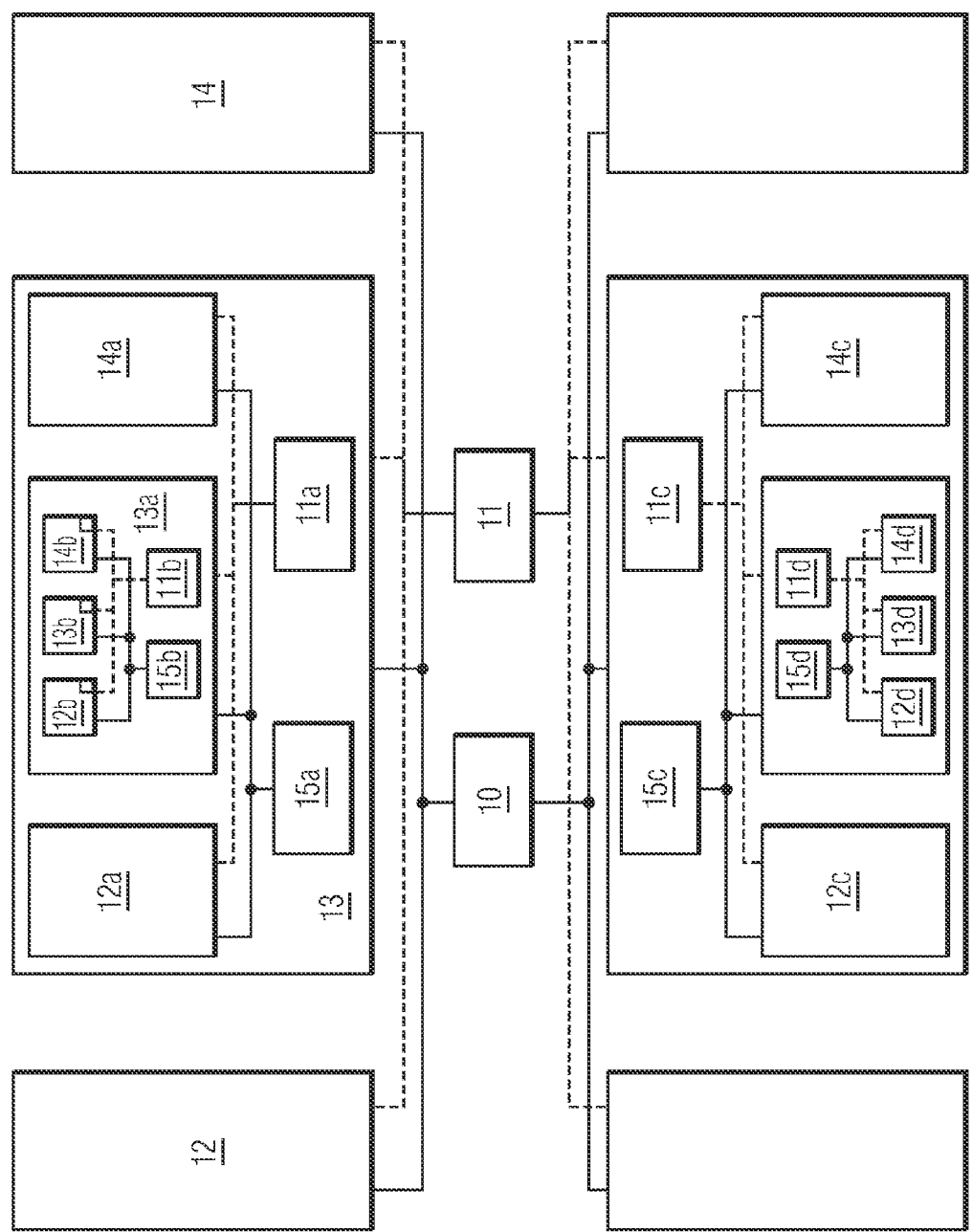
FIG. 1 is a simplified hierarchical block representation of a distributed control system.

Referring to FIG. 1, shown is a hierarchical structure of a distributed control system (DCS). Within the DCS, there are a plurality of functional blocks, a master clock generator 10, a power management unit 11, an initiator 12 for providing an input sequence, a decision block 13 being a target of initiator 12 for providing computation and decisions, and a target 14 in the form of a control block for providing control based upon the computation and decisions. Within the exemplary decision circuit block 13 is an initiator 12a, a decision circuit 13a, and a target 14a. Further, in this hierarchical view said decision circuit 13a itself is formed with elements including an initiator 12b, a decision circuit 13b, and a target 14b. Interfacing with the master clock generator 10, the power management unit 11, the initiator 12, the decision block 13, and the control block 14 is first controller circuit 15 (e.g., 15a, 15b, 15c, 15d).

Figure 2:
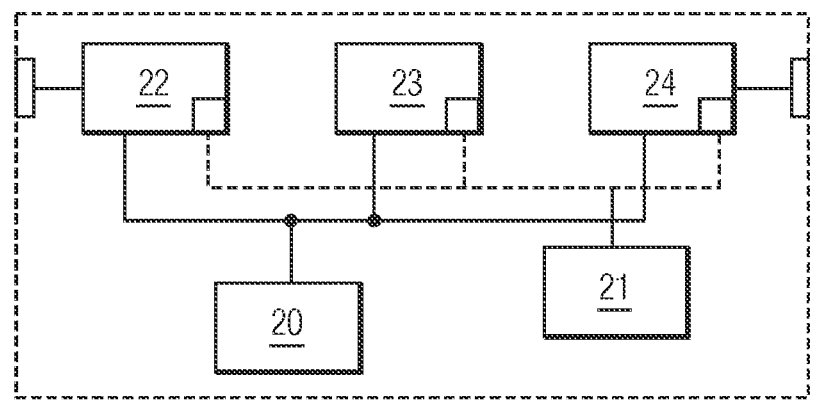
FIG. 2 is a schematic of a functional element within a distributed control system.

Referring to FIG. 2, when first controller 25 detects inactivity within a block, for example initiator block 22, then first controller 25 places decision block 23 and control block 24 into power down, leaving initiator block 22 to monitor for activity. Thus first controller 25 initiates a process of directing power management unit 21 to power down these functional blocks. Clock circuit 20 provides a clock signal to all blocks within the circuit. Alternatively, several clock circuits are employed.

Referring to FIG. 3, shown is a simplified flow diagram for a powering down operation. At 301 inactivity is detected and logical addresses are set identifying a circuit section as inactive. At 302 these addresses are one of broadcast and narrowcast to controller circuits. At the controller circuits an initial decision is made at 303 to either power down the circuit portion or reset the address through process 309 and return the circuit to 301. In the event a decision is made, then controller enters a loop of setting addresses 304 and seeking the setting of all logic states to zero. With decision 305, which either advances counters and loops in 310 or advances the power down to 306, for example by removing power to one power rail or both power rails in 307. At step 308 the distributed system is notified of the section power down. It then resets address lines and so forth as is appropriate at 311 before returning to 301. Each step in the exemplary simplified flow diagram is controlled by a trigger, such as a request for a new clock cycle, CLOCK_REQUEST. This allows very accurate control of the state of each driven line to allow for controlled power down operation to resulting a state of reduced power consumption that reduces a risk of parasitic current draw by disabled functional blocks.

Referring to FIG. 4, an exemplary high level state diagram 42 is shown, representing a state machine, supporting states to drive signals, for example within decision block 13 (See FIG. 1), to a predetermined state in the form of a low energy consumption state. This state machine is implemented within the initiator 12. Within the said first controller 15, a common address is reserved to denote all initiators associated with functional blocks that are capable of being powered down. Examples of the initiator 12 include a keypad control circuit, a microphone control circuit, and a motion detector circuit.

Upon generation of CLOCK_REQUEST for example with a high to low transition, the initiator triggers a clock signal from the master clock controller 10, and retrieves common address from power management unit 11 which has been defined for initiators settable to power down. When this retrieve operation is completed for this address, herein referred to as READ_STATE of FIG. 4, then the value returned on the corresponding data bus, READ_DATA_I, is the value of the initiator's command request line, COMMAND_REQUEST_I. In this example a value of the least significant bit (LSB) of the value read is significant. Alternatively, many other suitable schemes will be apparent to those skilled in the art.

If the COMMAND_REQUEST_I bus value returned is zero, in this example, then that value and the READ_DATA_I bus are low. Implicitly therefore, the COMMAND_DONE_I (Command Done on Ith Cycle) signal is low. Thus the bus has been taken to zero on all lines and the circuit initiator has entered the POWER_DOWN_STATE state at its output port.

Now consider the alternative event that the READ_DATA_I bus value is non-zero after the retrieve operation is performed in the READ_STATE. As such, the current value of the COMMAND_REQUEST_I signal and implicitly, COMMAND_DONE_I is high. Hence, the interface is not previously driven to zero and the circuit stays within the READ_STATE loop. This also triggers a further clock request and another read is performed from the address. On beginning this new transaction, COMMAND_REQUEST_I toggles to low. This then drives the READ_DATA_I low and the circuit enters the same final state as considered for the initial loop. Here, it has taken two clock requests to drive the initiator into the POWER_DOWN_STATE state.

Once in the POWER_DOWN_STATE state, the initiator drives all other DCS command addresses, examples include but are not limited to COMMAND_ADDRESS_I, COMMAND_MASK_I, COMMAND_READ_I and INITIAL_ID_I to low so that the circuit is now at logical "OFF" for all input ports and output ports. The power to this initiator (or initiator adapter) is preferably terminated ahead of the power down of the target circuit.

Applying this to the diagram of FIG. 2, the DCS has driven the output ports of initiator 22 to zero and removed the power to 23, which in turn drives the output registers of 23 low. If the circuit 23 does require a clocked powering down of its output ports then the above procedure would have triggered simultaneously as it would have read the same address as controller 22. Alternatively, referring to FIG. 1, these activities potentially drive the output ports of initiator 12b to zero and removed the power to 13b which in turn drives the output registers of 13b low. Thereafter the powering down of the elements 11b to 15b cause the distributed controller to consider powering down 13a, if this is the only sub-circuit or if all other sub-circuits are also shutdown. In that case, circuit 13a undertakes a clocked powering down of its output ports as outlined above. Optionally, it is triggered simultaneously as the same address for 12 as per controller 12b is retrieved.

Referring to FIG. 5 shown is a simplified state diagram 52 of a target circuit, such as decision block 13, being driven to zero in a dual phase arrangement. The power-down operation is again, controlled by the power management controller 11.

Within the target a single address is relied upon to implement this power down. This address is used for performing a function similar to that of the address within the controller for the initiator. For convenience, this address is labeled READ_TARGET_POWER_DOWN. When a data retrieval operation is performed on the READ_TARGET_POWER_DOWN address, the value obtained on the READ_DATA is a current value of the read data bus is logically exclusively OR'ed with the last registered and stored value of READ_DATA. This is extensible, as those skilled in control architectures appreciate, with, for example, the read data bus used in conjunction with other distributed control address such as for example COMMAND_RETRY (wherein a bus indicates busy) or COMMAND_ERROR (wherein an address is incomplete) and even COMMAND_SELECT. These are similarly exclusively OR'ed on a rotating basis into bits 2, 1, or 0 of an address. Thus when the RETRY is high, a RETRY request is returned and the bus is read. Equally when the current value of ERROR is high, an ERROR is noted and the address value re-clocked into the registers.

For example, when the current data on READ_DATA bus for the target is 0x0505, RETRY signal is low, ERROR signal is high, and SELECT signal is low. The read operation upon the READ_TARGET_POWER_DOWN address returns read data of ((0x0505|0x0|0x8|0x0)=0x050D. When an XOR operation is performed, 0x0008 (0x050D^0x0505) is driven onto DATA lines with the ERROR signal toggling. The bit that is affected by the SELECT signal is changed for each sequential read operation and rotated between bits 0, 1, and 2.

When a value of DATA is 0x00000505 upon entry and the CLOCK_REQUEST signal is low, the state machine is entered at the READ_FIRST state. In this state, a read operation is performed on the READ_TARGET_POWER_DOWN address. In this example, the RETRY and the ERROR signal are high and the SELECT signal is low. The value driven onto DATA is 0x0018 ((0x0505|0x18)^0x0505) with the ERROR signal and the RETRY signal indicating an error and a retry. The initiator detects the read data as 0x051D (0x0505|0x18). The signaling of the error and retry causes both the ERROR and RETRY signals to toggle low. Furthermore, the SELECT signal remains low.

The state machine transitions back to the READ_AGAIN state and performs another read operation. At the beginning of this read operation, the SELECT signal toggles high. Assuming the rotating bit selection indicates bit 0 should be affected by the SELECT signal, the read data is set to 0x0019 (0x0018|0x01). This causes 0x0001 to be driven onto DATA (0x0019^0x0018) lines. Because the read value (0x0019) is different from the previously read value (0x0018), the state machine remains in the READ_AGAIN state and executes another read operation.

The SELECT signal transitions to a low state at the beginning of the read operation, and bit 1 is the effected bit. The read value is 0x0001, based on the value of DATA XORed with 0x0 from the SELECT signal. This causes DATA to be driven to all zeros (0x0001^0x0001). The state machine compares 0x0001 to 0x0019, notes a difference, remains in the READ_AGAIN state and performs another read operation. This read operation causes the SELECT signal to transition high with bit 2 to be modified. The read value is 0x0000|0x4=0x0004 and DATA is driven to 0x0004. The state machine again compares this to the last value read and detects a difference (0x0004/=0x0001), the state machine remains in the READ_AGAIN state and executes another read operation. The SELECT signal transitions low and the value read is 0x0004 (from DATA). This causes DATA to be driven to 0x0000. The state machine detects that the same data has been read twice in succession, and transitions into the POWER_DOWN state.

This approach functions for any starting value of the SELECT, RETRY, and ERROR signals and any starting value on the DATA bus. With the exemplary process from two read operations to five read operations occur prior to the POWER_DOWN state. In light of processor speeds such a number of clock cycles is an extremely short period of time. Now that all lines are driven to zero, the power management unit 11, performs an operation for powering down the power rails to this functional circuit.

Figure 6:
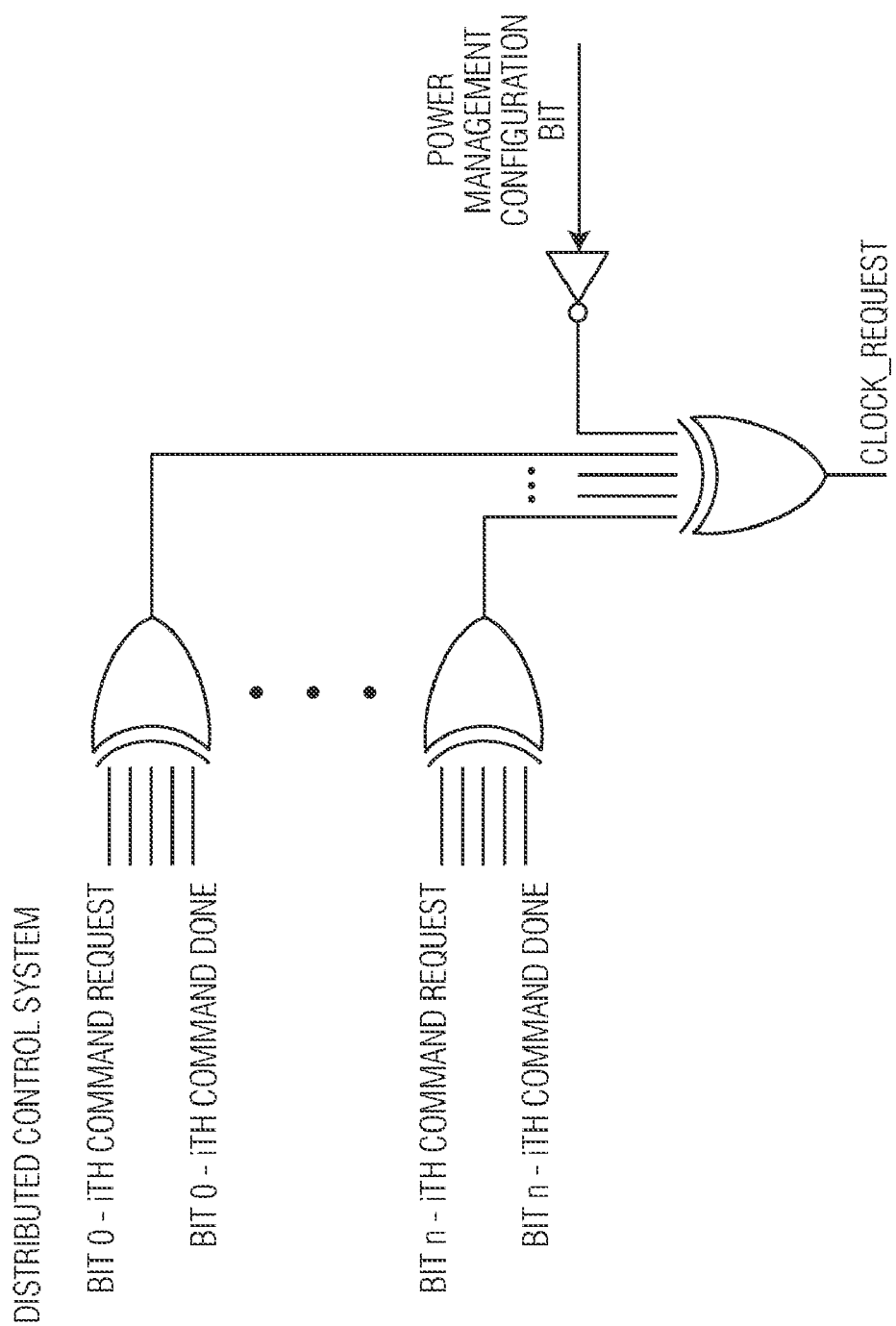

Within the above embodiments is described CLOCK_REQUEST (see FIG. 6). For example, the CLOCK_REQUEST is effected via a command interface with the controller 10 of FIG. 1. When the controller 10 decides to power down a specific circuit block or a portion of the circuits, a POWER_MANAGEMENT bit is set within the power management unit 11. In the examples provided for a DCS network, the disclosure relates to when the network is considered ready for power down—no further transactions remain to be done. Thus, power down is typically performed during a period of inactivity. When inactivity is not yet occurring, those of skill in the art will recognize that further actions are performed before applying the method of the present invention. Referring to FIG. 6, when CLOCK_REQUIRED signal is high, it indicates that a clock is required—that the circuit element is not ready for power down.

If the CLOCK_REQUEST is not asserted then the functional block is ready to be powered down. With DCS specifications, such a completion of transactions is deemed complete when COMMAND_REQUEST_I and COMMAND_DONE_I lines are equivalent logic. Hence an XOR operation or gate defines whether transactions remain for a given circuit block. Each initiator XOR using the Nth circuits REQUEST and DONE addresses is then ORed with the POWER_MANAGEMENT bit, which is shown inverted.

It will be evident to someone skilled in the art that the example provided for a distributed control scheme is may be implemented in other networks and with different protocols and command structures as are appropriate for that specification. Preferably, when implemented, the implementation allows for rapid switching of the output ports to a low power state while maintaining compatibility with the different protocol and with the network.

The identification of circuit block roles within the above description is intended as non-exhaustive. It is evident to one skilled in the art that a circuit block providing input address lines to another circuit block may in fact have input address lines of its own. Hence, said blocks may be linked in alternate arrangements from the example described but may still be controlled by achieving minimum power consumption when they are powered down. Further, those skilled in interface techniques between elements of a DCS will appreciate that wherein a set of data lines be termed as input lines, they may equally be output lines, and even bidirectional read/write lines according to overall protocol definitions and specific implementations of a system.

Numerous other embodiments may be envisaged without departing form the spirit or scope of the invention.

What is claimed is:

1. A method comprising:
   determining a first functional circuit block other than in use, the first functional circuit block including a first input port;
   providing an initiator circuit for providing a first signal to the first input port, wherein the first signal is a signal provided to the first functional circuit block unrelated to a power down command for the first functional circuit block; and,
   powering down the first functional circuit block by:
      switching the initiator circuit to effect the first signal such that the first signal is in a low power state for a duration during which the first functional circuit block is powered down, and,
      powering down the first functional circuit block into a reduced power consumption state.

2. A method according to claim 1 wherein the first functional circuit block is for effecting at least part of a communication protocol, switching performed in accordance with requirements of the communication protocol.

3. A method according to claim 2 wherein the communication protocol comprises a two-phase data transfer protocol.

4. A method according to claim 1 wherein switching of the initiator circuit is performed to effect each signal provided from the initiator circuit to the first functional circuit block such that each signal is in a low power state for a duration during which the first functional circuit block is powered down.

5. A method according to claim 1 comprising:
   determining each circuit from which a drive signal is provided to the first functional circuit block; and,
   switching of each to effect each drive signal provided from said each circuit to the first functional circuit block such that each drive signal is in a low power state for a duration during which the first functional circuit block is powered down.

6. A method according to claim 1 comprising switching of the first functional circuit block to effect each output signal provided from the first functional circuit block such that each output signal is in a low power state prior to and for a duration during which the first functional circuit block powered down.

7. A method according to claim 1 wherein switching is always performable with two to five read operations.

8. A method according to claim 1 wherein the first functional circuit block is part of a functional circuit block capable of being powered down, the first functional circuit block powering down when the functional circuit block is powered down.

9. A method according to claim 1 wherein after setting addressable states to the lowest power consumption, power to the power rails is sequentially reduced, thereby removing the biasing to the first functional circuit block.

10. A circuit comprising:
   a first functional circuit block including an input port;
   a initiator circuit for providing a first signal to the input port of the first functional circuit block; and,
   a power management block for switching the initiator circuit to effect the first signal such that the first signal is in a low power state for a duration during which the first functional circuit block is powered down and powering down the first functional circuit block into a reduced power consumption state, wherein the power management block comprises circuitry for switching of each circuit providing a driven input signal capable of parasitically powering circuitry within the first functional circuit block to an input port of the first functional circuit block, the switching to effect the driven input signals such that the driven input signals are switched into a low power state.

11. A circuit according to claim 10 comprising: a detection circuit for detecting a circuit other than in essential operation, the circuit forming the first functional circuit block.

12. A circuit according to claim 10 comprising circuitry for communication in accordance with a data communication protocol.

13. A circuit according to claim 12 wherein the data communication protocol comprises a two phase data transfer protocol.

14. A circuit according to claim 10 wherein the first signal is other than a signal driven by the power management block.

15. A circuit according to claim 10 wherein the power management block comprises addressing circuitry for addressing circuits to effect switching thereof to effect signals driven therefrom such that the signals are switched into a low power state.

16. A circuit according to claim 10 wherein the power management block comprises circuitry for switching of each circuit providing a driven input signal to an input port of the first functional circuit block, the switching to effect signals driven therefrom such that the signals are switched into a low power state.

17. A circuit according to claim 10 wherein the power management block comprises control circuitry for switching of the first functional circuit block to effect output signals driven therefrom such that the output signals are controllably switched into a low power state.

18. A method comprising:
   determining a first functional circuit block including a first input port;
   powering down the first functional circuit block by:
   controllably switching each circuit providing driven input data signals to the first functional circuit block until the driven input data signals are in a low power state, wherein switching is always performable with two to five read operations, and,
   powering down the first functional circuit block into a reduced power consumption state.

19. A method comprising:
   determining a first functional circuit block including a plurality of output ports;
   powering down the first functional circuit block by:
   controllably switching the first functional circuit block providing output data signals therefrom until the output data signals are in a low power state, wherein switching is always performable with two to five read operations, and,
   then powering down the first functional circuit block into a reduced power consumption state.

* * * * *